(12) United States Patent
Boullery et al.

(10) Patent No.: US 9,704,359 B2
(45) Date of Patent: Jul. 11, 2017

(54) LIGHTING CONTROL FOR LOCATION FINDING

(71) Applicant: International Business Machines Corporation, Armonk, NY (US)

(72) Inventors: Didier Boullery, Sartrouville (FR); Marc P. Yvon, Antony (FR)

(73) Assignee: International Business Machines Corporation, Armonk, NY (US)

(*) Notice: Subject to any disclaimer, the term of this patent is extended or adjusted under 35 U.S.C. 154(b) by 26 days.

(21) Appl. No.: 14/867,305

(22) Filed: Sep. 28, 2015

(65) Prior Publication Data

US 2016/0292975 A1    Oct. 6, 2016

Related U.S. Application Data

(63) Continuation of application No. 14/675,821, filed on Apr. 1, 2015.

(51) Int. Cl.
*G01R 31/11* (2006.01)
*G08B 7/06* (2006.01)
(Continued)

(52) U.S. Cl.
CPC ............ *G08B 7/066* (2013.01); *G01S 5/02* (2013.01); *G01S 5/0289* (2013.01); *H05B 33/0821* (2013.01)

(58) Field of Classification Search
CPC ............ G01B 11/2518; G01B 11/2527; G01B 11/2536; H05B 33/0803; H05B 33/0821; H05B 33/0854; H05B 33/0872; G06Q 30/06; G06Q 30/02; G06Q 30/0241; G06Q 30/0283; G06Q 30/0623; G06Q 30/0639

See application file for complete search history.

(56) References Cited

U.S. PATENT DOCUMENTS 6,912,507 B1    6/2005 Phillips et al.
7,147,154 B2    12/2006 Myers et al.
(Continued)

OTHER PUBLICATIONS

Hicks et al., "SmartMart: IoT-based In-store mapping for mobile devices", 9th International Conference on Collaborative Computing: Networking, Applications and Worksharing (Collaboratecom), Oct. 2013.

(Continued)

*Primary Examiner* — Minh N Tang
(74) *Attorney, Agent, or Firm* — Jay Wahlquist

(57) ABSTRACT

Lighting control for location finding is disclosed. According to embodiments, lighting control can include determining, using a group of location detectors, a first location of a computing device of a user, and obtaining, from the computing device, a target location for the user. Lighting control can include determining a path from the first location to the target location, the path determined at least based on a lighting system including a group of light emitting diode (LED) arrays, and indicating, using a first LED array of the group of LED arrays, a first portion of the path to the target location. The first portion of the path can be indicated by determining, for the plurality of LEDs of the first LED array, at least one LED that is visible at the first location, and outputting light from the at least one LED that is visible at the first location.

5 Claims, 7 Drawing Sheets

(51) Int. Cl.
G01S 5/02 (2010.01)
H05B 33/08 (2006.01)

(56) References Cited

U.S. PATENT DOCUMENTS

| | | | |
|---|---|---|---|
| 8,717,162 B2 | 5/2014 | Sundholm | |
| 2002/0084323 A1* | 7/2002 | Benyak | G06Q 20/201 235/383 |
| 2010/0008588 A1* | 1/2010 | Feldkhun | G01B 11/2518 382/206 |
| 2012/0259732 A1 | 10/2012 | Sasankan et al. | |
| 2014/0132183 A1 | 5/2014 | Van Herpen | |
| 2014/0156459 A1 | 6/2014 | Zises | |
| 2014/0207615 A1 | 7/2014 | Li et al. | |

OTHER PUBLICATIONS

Lin, J., "Philips Launches Smart LED Light Guide System for Retail Applications", © 2015 LEDinside, a Business Division of TrendForce Corp. (Last Modified: Feb. 18, 2014 at 13:07) http://www.ledinside.com/products/2014/2philips_launches_smart_led_light_guide_ystem_for_supermarkets. (Last Accessed: Mar. 5, 2015 @ 13:13).
Boullery et al., "Lighting Control for Location Finding," U.S. Appl. No. 14/675,821, filed Apr. 1, 2015.
IBM, "List of IBM Patents or Patent Applications Treated as Related," signed Sep. 25, 2015, 2 pgs.

* cited by examiner

LIGHTING CONTROL FOR LOCATION FINDING

BACKGROUND

Aspects of the present disclosure relate to the control of a lighting system, and more specifically, to the use of the lighting system as a way of directing an individual to a location.

SUMMARY

Embodiments of the present disclosure are directed towards a method of lighting control for location finding. In embodiments, the method can include determining, using a group of location detectors, a first location of a computing device of a user. In embodiments, the method can include obtaining, from the computing device, a target location for the user. In embodiments, the method can include determining a path from the first location to the target location, the path determined at least based on a lighting system including a group of light emitting diode (LED) arrays. Each LED array of the group of LED arrays can include a plurality of LEDs arranged in a semi-circular formation on a chassis. In embodiments, the method can include indicating, using a first LED array of the group of LED arrays, a first portion of the path to the target location. In embodiments, the first portion of the path can be indicated by determining, for the plurality of LEDs of the first LED array, at least one LED that is visible at the first location, and outputting light from the at least one LED of the first LED array that is visible at the first location.

Embodiments of the present disclosure are directed towards a system of lighting control for location finding. In embodiments, the system can include a group of location detectors, a group of light emitting diode (LED) arrays, a processor, and a computer readable storage medium. In embodiments, each LED array of the group of LED arrays can include a plurality of LEDs arranged in a semi-circular formation on a chassis. In embodiments, the processor can be communicatively connected to the group of location detectors and to the group of LED arrays. In embodiments, the computer readable storage medium can have program instructions embodied therewith. The program instructions can be executable by the processor to cause the processor to determine, using the group of location detectors, a first location of a computing device of a user. The program instructions can cause the processor to obtain, from the computing device, a target location for the user and determine a path from the first location of the computing device to the target location. The path can be determined at least based on the group of LED arrays. In embodiments, the program instructions can cause the processor to indicate, by using a first LED array of the group of LED arrays, a first portion of the path. In embodiments, being caused to indicate the first portion of the path includes being caused to determine, for the plurality of LEDs of the first LED array, at least one LED that is visible at the first location, and cause the first LED array to output light from the at least one LED that is visible at the first location.

Embodiments of the present disclosure are directed towards a computer program product for controlling a lighting system. In embodiments, the computer program product can include a computer readable storage medium having program instructions embodied therewith. The program instructions can be executable by a processor to cause the processor to determine, using a group of location detectors, a first location of a computing device of a user, and obtain, from the computing device, a target location for the user. The program instructions can be executable by the processor to cause the processor to determine a path from the first location to the target location, the path determined at least based on a lighting system including a group of light emitting diode (LED) arrays. Each LED array of the group of LED arrays can include a plurality of LEDs arranged in a semi-circular formation on a chassis. The program instructions can cause the processor to indicate, using a first LED array of the group of LED arrays, a first portion of the path to the target location. In embodiments, being caused to indicate the first portion of the path includes being caused to determine, for the plurality of LEDs of the first LED array, at least one LED that is visible at the first location, and cause the first LED array to output light from the at least one LED that is visible at the first location.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
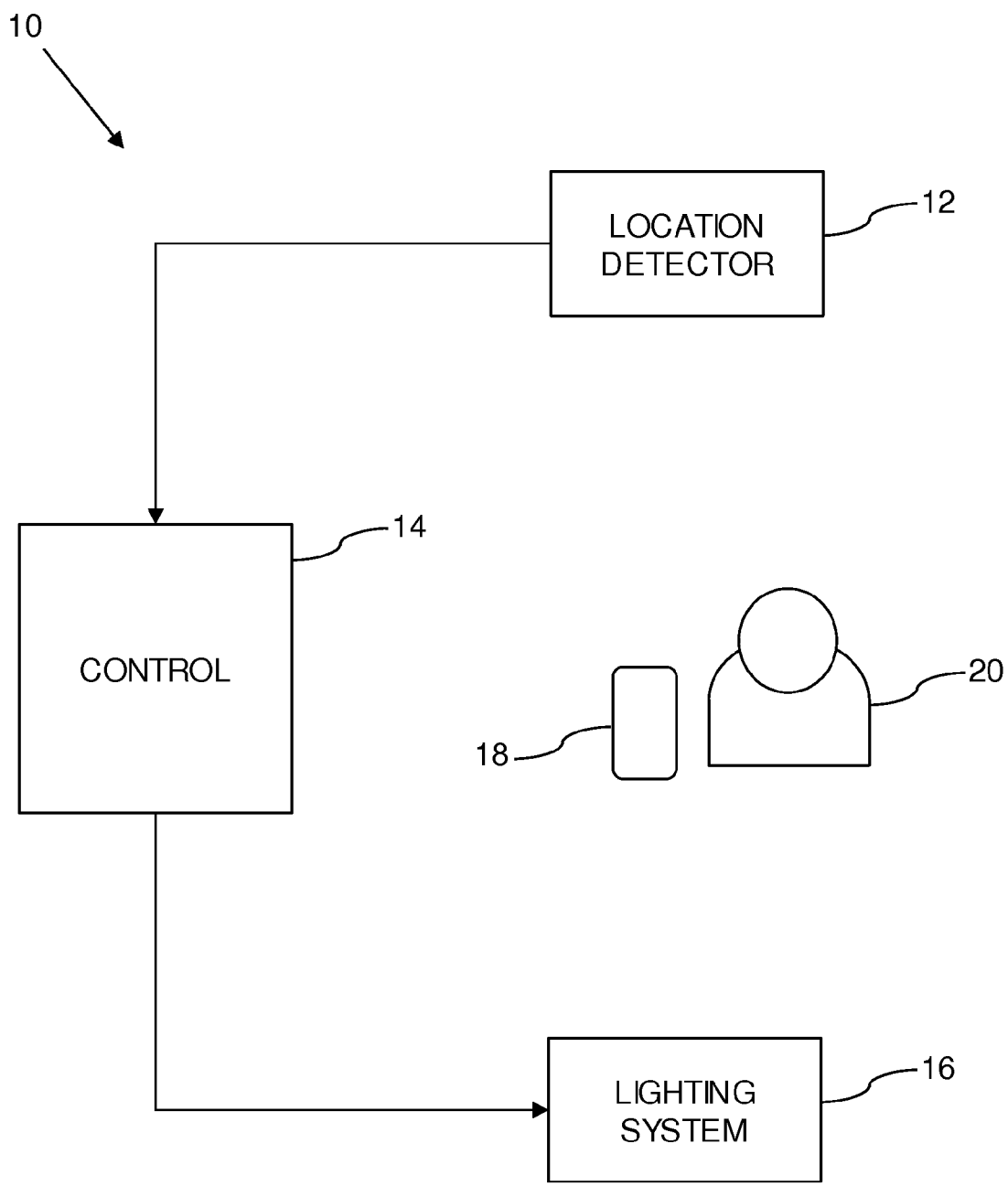
FIG. 1 depicts a schematic diagram of a system, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the control of a lighting system, more particular aspects relate to the use of the lighting system as a way of directing an individual to a location. While the present disclosure is not necessarily limited to such applications, various aspects of the disclosure may be appreciated through a discussion of various examples using this context.

According to embodiments of the present disclosure, lighting control for location finding is disclosed. In embodiments, a method of lighting control for location finding can include determining a first location of a computing device of a user and obtaining, from the computing device, a target location for the user. The method can include determining a path from the first location to the target location. The path can be determined at least based on a lighting system that includes a group of light emitting diode (LED) arrays.

Described further herein, in embodiments, each LED array of the group of LED arrays includes a plurality of LEDs arranged in a semi-circular formation on a chassis. In embodiments, the method can include indicating, using a first LED array of the group of LED arrays, a first portion of the path to the target location. According to embodiments, the first portion of the path can be indicated by determining, for the plurality of LEDs of the first LED array, at least one LED that is visible at the first location and outputting light from the at least one LED that is visible at the first location.

Referring now to FIG. 1, a system 10 for lighting control for location finding can be seen according to embodiments of the present disclosure. The system 10 can include a location detector 12, a controller 14 communicatively connected to the location detector 12 and a lighting system 16, which is also communicatively connected to the controller 14. The connections between the devices that make up the system 10 are here shown as using wired communication network such as Ethernet, but the devices could also be connected together using a local wireless technology such as WiFi. A combination of wired and wireless connections could also be used. In embodiments, the term wireless, as referred to herein, refers to transmitting and/or receiving signals (e.g. data) sent over air. Each device in the system 10 can be autonomous and individually powered.

In embodiments, the location detector 12 is configured to detect the location of a computing device 18 of a user 20. In embodiments, the location detector 12 is a short-range wireless beacon that can transmit and receive communications to and from the user's computing device 18. In embodiments, the location detector 12 can work in a wide variety of different ways. For example, the location detector 12 could use local wireless technologies such as Bluetooth, Wi-Fi, or other suitable wireless communication. Based on communications to and from the computing device 18, the location detector can determine the approximate location of the computing device 18. For example, in some embodiments, the location detector 12 can determine the location of the computing device 18 of a user 20 to an accuracy of less than 1 meter.

In embodiments the location detector 12 can be a part of a group of location detectors 12. In some embodiments, the group of location detectors 12 can include a plurality of location detectors 12 that are distributed across a geographic area to increase signal coverage over a geographic area. For example, a supermarket or store could include a group of location detectors 12 distributed throughout the store so that the range of each of the wireless beacons cover the entire store. Accordingly, a user 20 entering the store could be more accurately located by their computing device 18 while present in the store. In some embodiments, the group of location detectors 12 could include a single location detector 12.

In embodiments, the controller 14 can be configured to obtain a target location for the user 20 and determine one or more lights of the lighting system 16 that indicate a path to the target location for the user 20. Described further herein, determining lights to indicate a path for the user 20 can include determining one or more visible lights of the lighting system 16. In embodiments, the visibility of the lights is determined based on the location of the computing device 18 of the user 20. In embodiments, the controller 14 can include one or more processors and memory. The memory can include program instructions executable by the one or more processors to cause the processor to perform aspects of the present disclosure. For example, in embodiments, the controller 14 is configured to determine the location of the computing device 18 using the location detector 12. In embodiments, the controller 14 is configured to determine the target location of the user, and determine a path from the location of the computing device 18 to the target location. In embodiments, the controller 14 can determine the path to the target location based on the lighting system 16. In embodiments, the controller 14 can be configured to transmit instructions to the lighting system 16 based on the path.

In embodiments, the lighting system 16 is configured to output light from one or more lights of the lighting system 16 based on instructions of the controller 14, to indicate a path for the user 20 to the target location. Described further herein, in embodiments, the lighting system 16 can include a group of one or more light emitting diode (LED) arrays. Each of the LED arrays can include a plurality of LEDs arranged in a semi-circular formation, positioned on a chassis. The plurality of LEDs can be arranged in the semi-circular formation so that a user 20 can view one or more of the LEDs from a range of viewing angles. In some embodiments, the LEDs can be arranged on the chassis in a semi-hemispherical formation. In some embodiments, the LEDs can be arranged on the chassis in a circular formation on the chassis. In embodiments, the controller 14 can use the location of the computing device 18 to determine one or more of the LEDs on the LED array that are visible at the location. In embodiments, the controller 14 can cause the LED array to output light from the one or more visible LEDs to indicate a path for the user 20 from their location to the target location. In some embodiments, the lighting system 16 can include a plurality of lighting arrays constructed using various types of lighting technologies.

In embodiments, the computing device 18 can be a mobile computing device including logic and memory that can be carried by the user 20. For example, the computing device 18 could be a smart phone, mobile phone, tablet device, laptop, or other suitable computing device.

Figure 2:
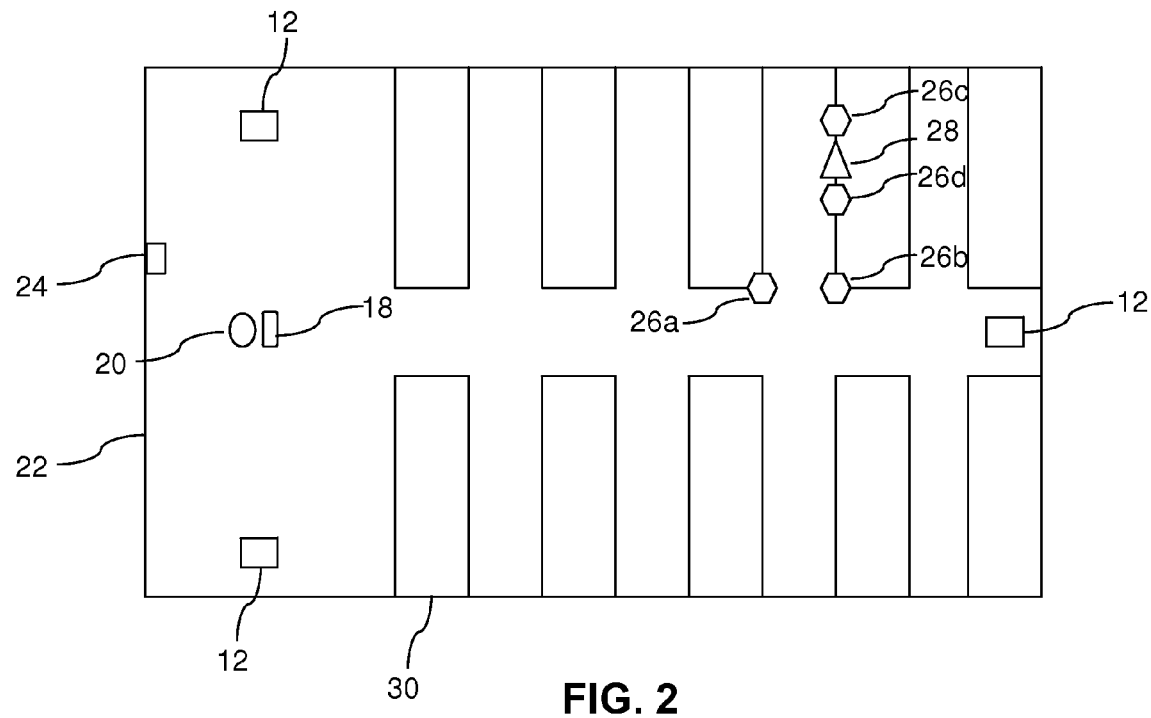
FIGS. 2-9 depict schematic diagrams of a system for lighting control in a shop, according to embodiments of the present disclosure.

Referring now to FIG. 2, an example diagram of lighting control for location finding can be seen, according to embodiments, of the present disclosure. FIG. 2 shows an environment in which the user 20 has entered a shop 22 and the system 10 (FIG. 1) will guide the user 20 to one or more target locations. Seen in FIG. 2 the target locations are based on articles in the shop 22 that they wish to buy. However, in various embodiments, the target locations can be determined based on various other criteria. In embodiments, the system additionally includes a computing device reader 24 that is placed at the entrance to the shop 22. The reader 24 can be connected to the controller of the system and can be configured to query the computing device 18 of the user 20 for user information, in this case a shopping list. A group of location detectors 12 includes three beacons, placed in different locations within the shop 22 and various lights 26a-26d of the lighting system 16 (FIG. 1) are shown. In embodiments, the lights 26a-26d of the lighting system 16 are individual LED arrays that are part of a group of LED arrays, as described herein. As described in FIGS. 2-9, the location of the computing device 18 and the user 20 are assumed to be the approximately the same. However in some embodiments, the device 18 and the use 20 may be in separate distinct locations.

Although examples described herein, are described in the context of the user 20 navigating a shop 22 in order to locate an item 28, the same system and methodology can be used in many different applications. For example, the system could be employed in a sports stadium where the purpose of the system is to guide the user 20 to their specific seat or to the correct entrance to the seating area. In some examples, the system could also be used in an airport to guide the user 20 to the correct departure gate or to the correct baggage collection point, for example. Another possible implementation of the system could be in a hotel, where the system is designed to direct the user 20 to and from the lobby of the hotel via the lift to their room, for example.

In FIG. 2, the user 20 has just entered the shop 22 and the device reader 24 communicates with the user's computing device 18 to determine the items that the user 20 wishes to purchase, receiving user information from the computing device 18. In embodiments, this information is passed to the controller which determines one or more target locations for the user 20. Accordingly, the controller can determine a path from the location of the computing device 18 to a target location of the one or more target locations. For example in embodiments, the controller could determine a path from the current location of the user to the closest target location (e.g. item 28) within the shop 22. In embodiments, the controller can determine the path at least based on the position of lights 26a-26d. For example, in embodiments, the path is routed through areas of the store 22 that include lights 26a-26d. Since, in embodiments, controller uses lights 26a-26d to indicate the path, path can be designed to follow the locations of lights 26a-26d throughout the store 22.

At this point none of the lights 26a-26d are illuminated. The user 20 is assumed to be heading in a forwards direction between the rows of shelves 30. In embodiments, the location detectors 12 are able to detect the current location of the computing device 18 as the user 20 moves through the shop 22.

In embodiments, the current target location (e.g. item 28) of the user 20 is not necessarily the actual final location of the item. In embodiments, the current target location could be an intermediate point (a waypoint) on the route that has been generated that will lead the user to the location of the item. As discussed herein, a device reader can query the computing device of the user for user information and the controller can determine the target location for the user from the queried user information. The target location can be a set of waypoints, with the user being led to each waypoint in turn until they have reached the final destination.

Figure 3:
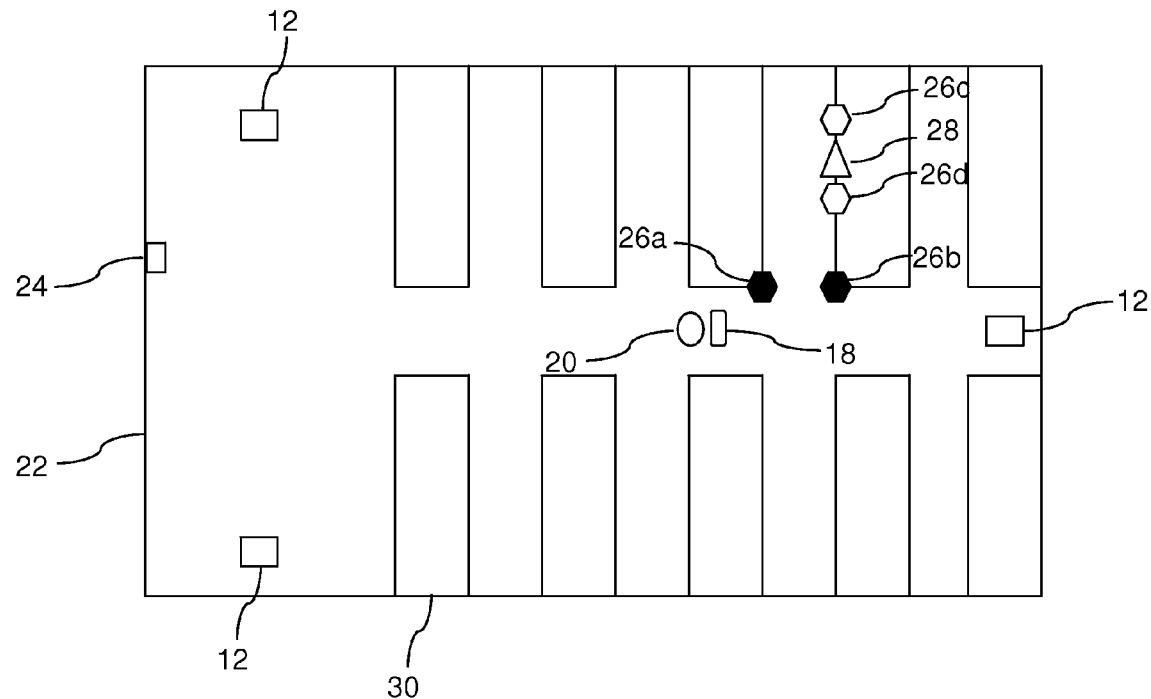

In FIG. 3, the user 20 has now moved into a position where lights 26a and 26b are illuminated. In embodiments, the controller, using location detectors 12, can determine that based on the location of the computing device 18, lights 26a and 26b are visible. Accordingly, the controller can communicate with the lighting system, including lights 26a and 26b, to output light from lights at 26a and 26b to indicate a first portion of the path to the target location at item 28. In embodiments, the lights 26a and 26b are multi-directional and can be part of an LED array as described herein, for example. In embodiments, where lights 26a and 26b are LED arrays as described herein, the LED arrays can limit light output from the plurality of LEDs in each light 26a and 26b lights to LEDs which are positioned in the direction of the computing device 18. Accordingly, this can reduce the total light output of lights 26a and 26b so that the indication of the path to the target location is visible in the proximity of the user 20.

Figure 4:
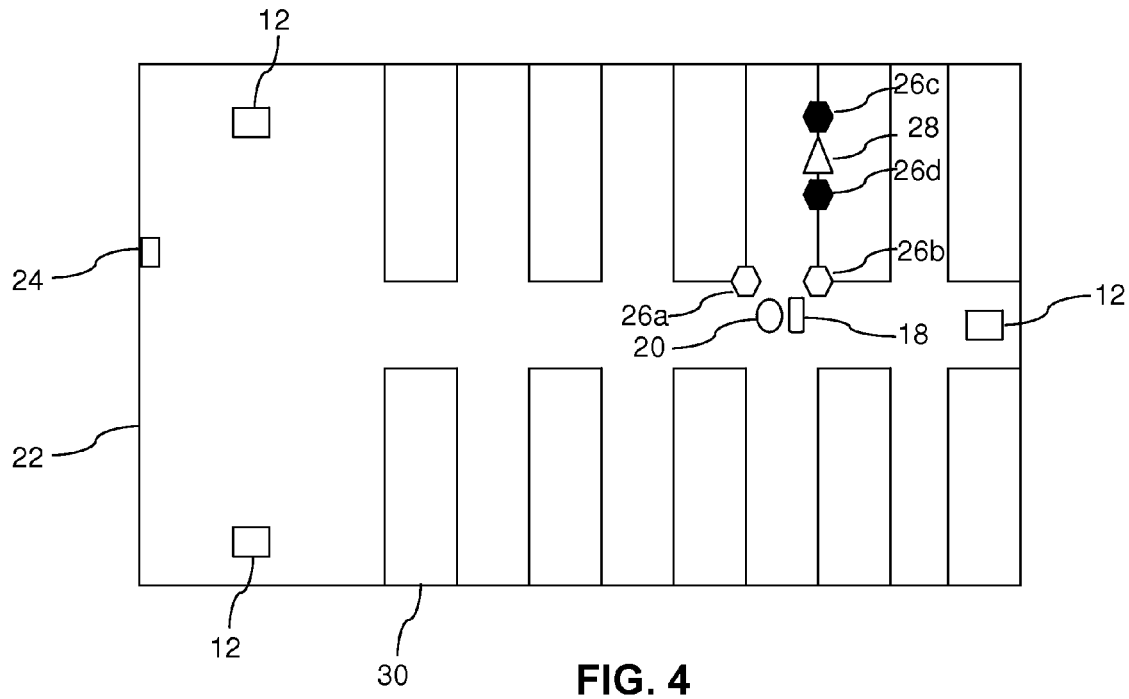

In FIG. 4, the user 20 has moved into a position at the opening between two rows of shelves 30, guided to that position by the pair of lights 26a and 26b of the lighting system 16. In embodiments, the controller can determine that based on the position of the computing device 18, the user has been successfully guided along the first portion of the path, as described herein. In embodiments, the controller can determine that the user 20 has been guided along the first portion of the path based on a proximity threshold of the user 20 to lights 26a and 26b. For example, in embodiments, the proximity threshold can be selected as a value which indicates that the user has reached the first portion of the path as indicated by lights 26a and 26b in FIG. 3. In embodiments, the proximity threshold can be selected as various values. For example, in embodiments, the proximity threshold could be selected as five feet from one or more of lights 26a and 26b. Accordingly, once the user 20 is located within, for example, five feet of the lights 26a or 26b, the controller can deactivate lights 26a and 26b. Controller can then use lights 26d and 26c to indicate a second portion of the path to the target location at item 28, described further herein.

As shown in FIG. 4, lights 26c and 26d are now illuminated to indicate the target location. As described herein, the controller can indicate the second portion of the path to the target location by outputting light from one or more lights in the direction of the computing device 18.

Figure 5:
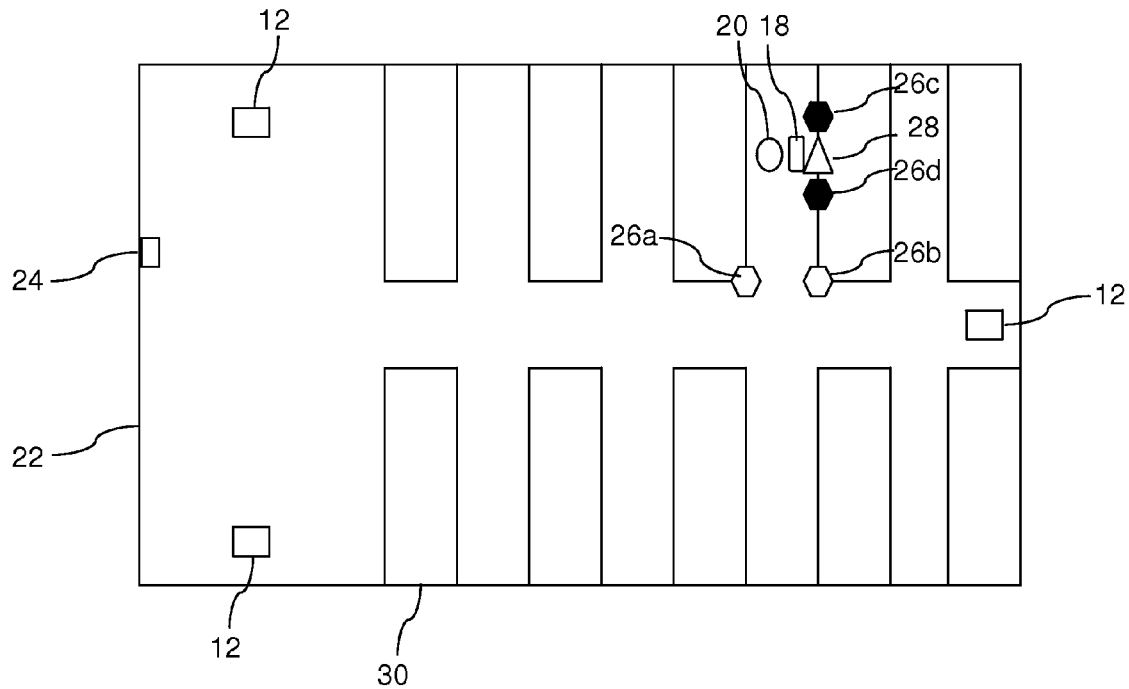

The user 20 approaches the position of the item 28, as shown in FIG. 5. The lights 26c and 26d are visible to the user 20 as they enter the space between the two rows of shelves 30. In embodiments, the lighting system uses pairs of lights, such as lights 26c and 26d to guide the user 20 to a location that is in-between the two lights (e.g. the item 28 in between lights 26c and 26d). In embodiments, the user's 20 current location, based on computing device 20, is being monitored in real time by the three location detectors 12, which feedback to the controller.

Once the user 20 has reached the location shown in FIG. 5, then it is assumed that the user 20 has taken the item 28 from the shelf 30, this can be confirmed by using a time threshold and a proximity threshold for the user 20 at the location. For example, in embodiments, once the user 20 has spent at least fifteen seconds within five feet of lights 26c and 26d, then it is assumed by the controller that the user 20 has picked up the desired item 28 and has placed that item 28 into their shopping basket. In embodiments, the controller is able to update the information stored for the user 20 in relation to the computing device 18, thereby marking the item 28 as purchased.

Figure 6:
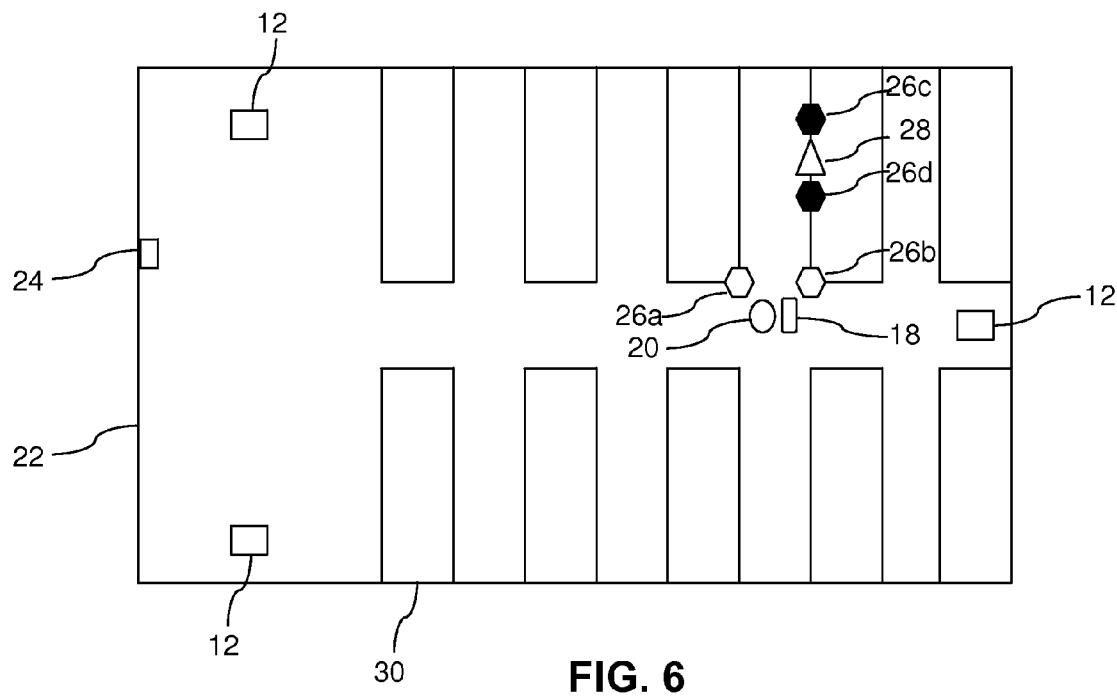

Although the system 10 as described above functions if the user 20 is only buying a single item 28 from the shop 22 (e.g. one target location), in many situations the user 20 will actually want to purchase several different items 28 that are located in different parts of the shop 22 (e.g. multiple target locations). In FIG. 6, the controller determines a second path from the location of user 20 to a new target location at a second item 28b. Accordingly, lights 26c and 26d are no longer illuminated and the lights 26a and 26b have turned back on to indicate a first portion of the second path to the user 20.

Figure 7:
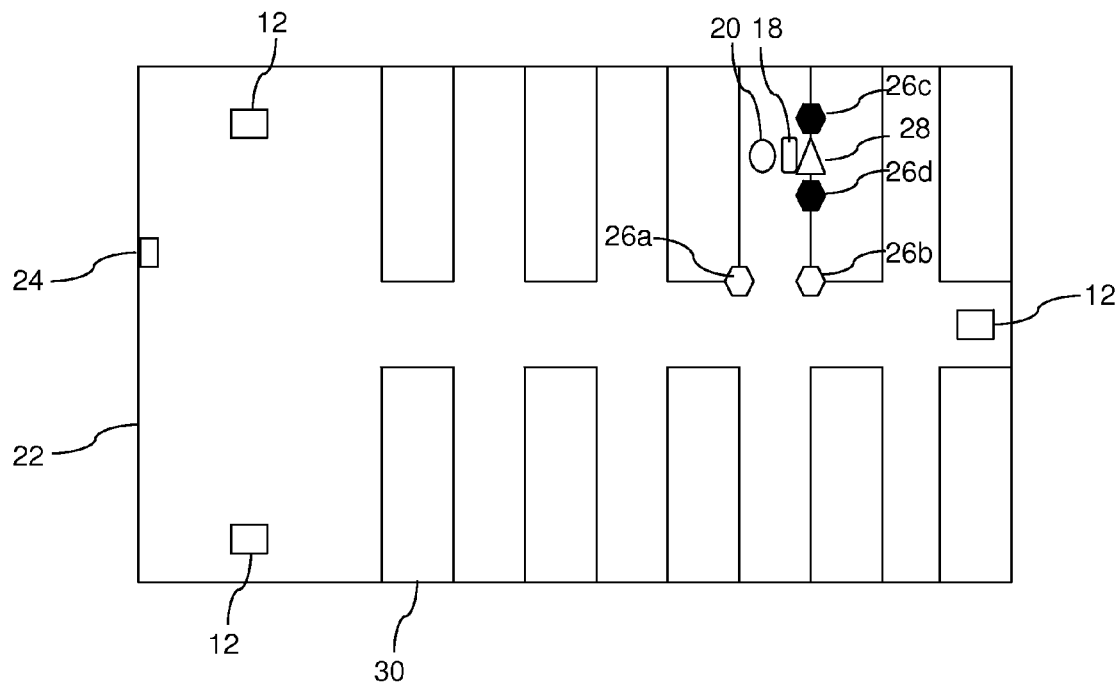
Figure 8:
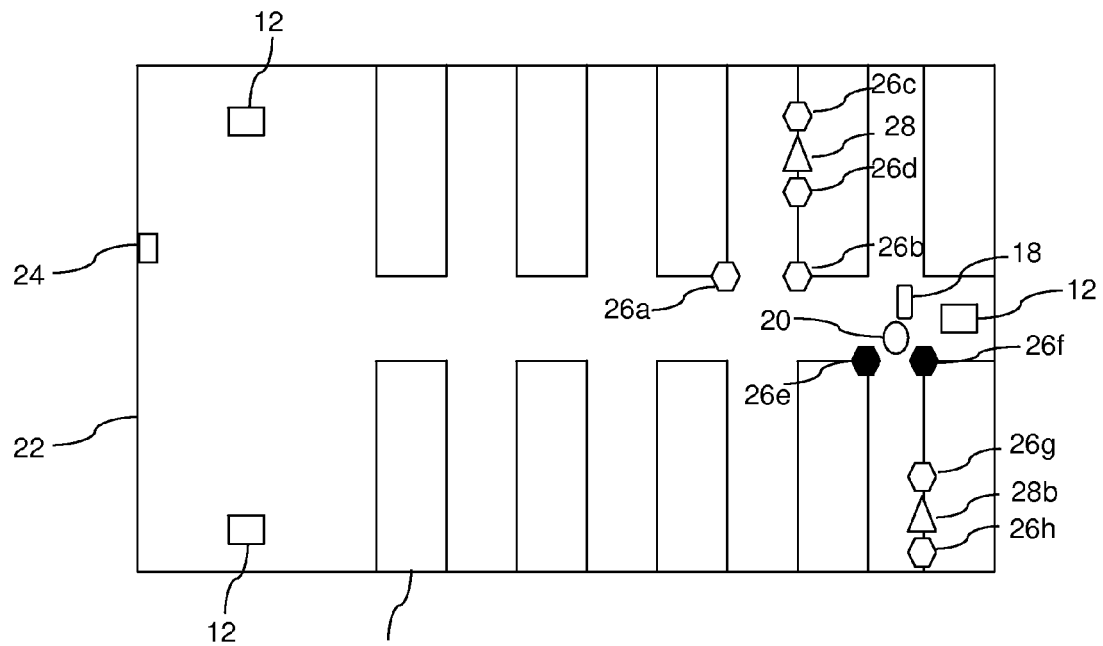

In FIG. 7, the user 20 has reached the entrance of the current shelves. In embodiments, the user's location is being monitored in real time by the location detectors 12 which can identify the current position of the user's computing device 18. This is fed back to the controller which controls the lighting system 16. Lights 26e and 26f are now illuminated, these indicate a second portion of the second path to the target location. As described herein, lights 26e and 26f are visible at the user's current location (the location of the computing device 18). In FIG. 8, the user 20 moves towards the lights 26e and 26f until it is detected that the user 20 has reached the entrance to the desired set of shelves 30, shown in FIG. 8.

Figure 9:
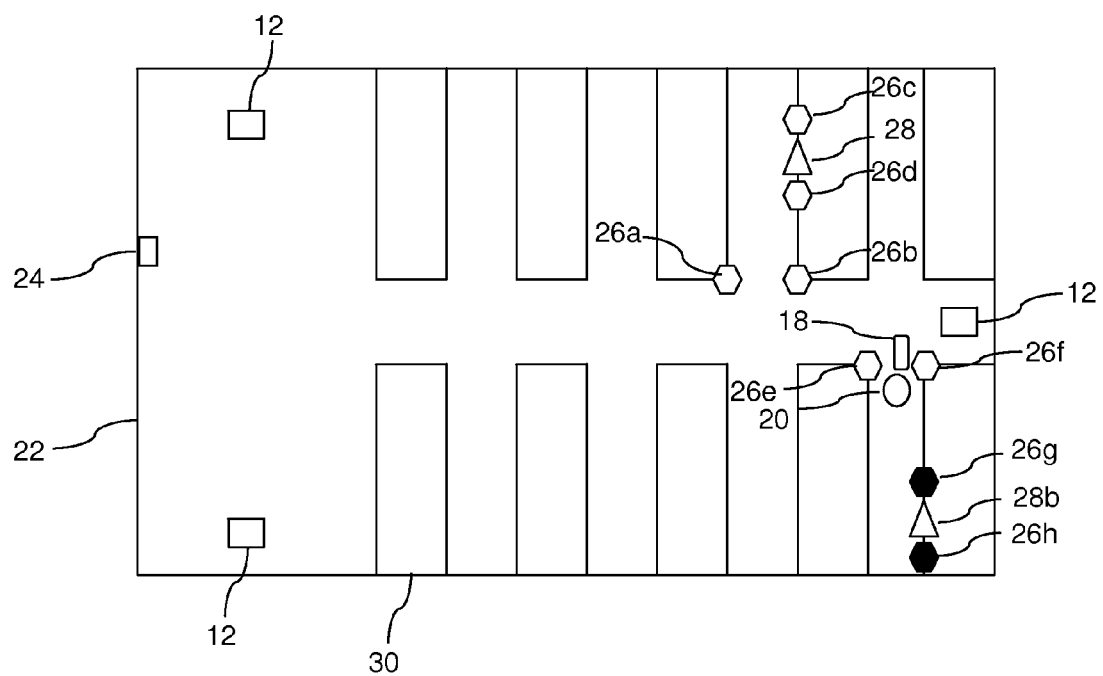

Referring to FIG. 9, once the user 20 has reached the opening of the current set of shelves 30, then the two lights 26e and 26f will be turned off and lights 26g and 26h will be illuminated, as described herein. These two lights 26g and 26h are used to guide the user 20 to the desired item 28b, in a similar manner as was used in guiding the user 20 to the first item 28. In this way the user 20 can be guided to one or more target locations (e.g. to the various items 28 on the user's shopping list). In some instances, this can help a user 20 to increase the speed of navigation while shopping.

In embodiments, the lighting system 16 (FIG. 1) that is used in the system 10 (FIG. 1) can provide a lighting output that is able to output light in the direction of the user 20 based on the user's current location. This can be achieved using a plurality of individual lighting arrays 32, as shown in FIGS. 10 and 11.

Figure 10:
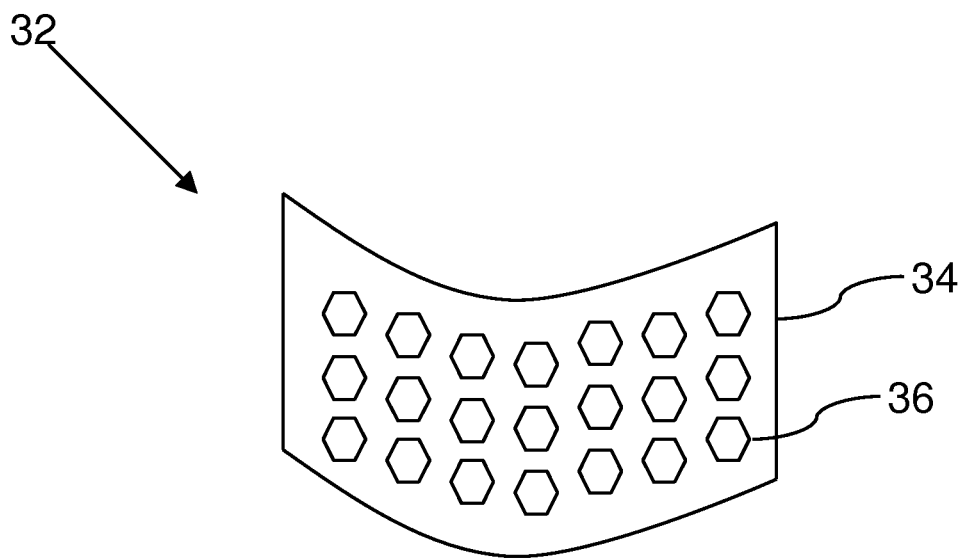
FIGS. 10 and 11 depict schematic diagrams of lighting arrays, according to embodiments of the present disclosure.

FIG. 10 shows a front view of an example lighting array 32 that includes a matrix of individual lights 36 mounted on a curved chassis 34. In embodiments, the lighting array 32 is an LED system that is designed to be suspended above the locations being illuminated, for example at a height of between three to six meters. In the example of FIG. 10, twenty-one different lights 36 form the array 32 in three rows of seven lights 36. Each column of three lights 36 pointing in the same direction can be used to direct a user who is close to the array 32 (using the lowest light 36 in the column) and to direct a user 20 who is further away from the array 32 (using the highest light 36 in the column). In embodiments, lights 36 can be LEDs mounted on chassis 34. As chassis 34 can be curved, lights 36 can be mounted in a semi-circular formation on chassis 34, such that each column of lights 36 is pointed in a distinct direction.

In embodiments, the FIG. 10 embodiment of the lighting array 32 allows twenty-one different locations to be illuminated, one for each light 36. In embodiments, these locations are mapped to the controller 14 (FIG. 1). Different users can be guided to the same location using an array 32 such as that shown in FIG. 10. For example, as a user moves towards a target location, the individual light 36 being lit within the array 32 can change to reflect the change in the user's current location. In embodiments, the lighting array 32 and controller update which light is illuminated to follow the user's current location so that only the area in the general vicinity of the user can see an individual illuminated light 36 at any one time. In embodiments, a user's precise location can therefore be targeted by the lights 36 of the array 32. Other arrays of lights 36 can be used, for example with ten lines of fifty columns, with the total number being used being dependent on the lighting technology selected. As described herein, in embodiments, the lights 36 can be individual LEDs positioned on a chassis 34. According to embodiments, the LEDs can be positioned in a semi-circular formation to cover multiple radial directions from the curved chassis 34.

Figure 11:
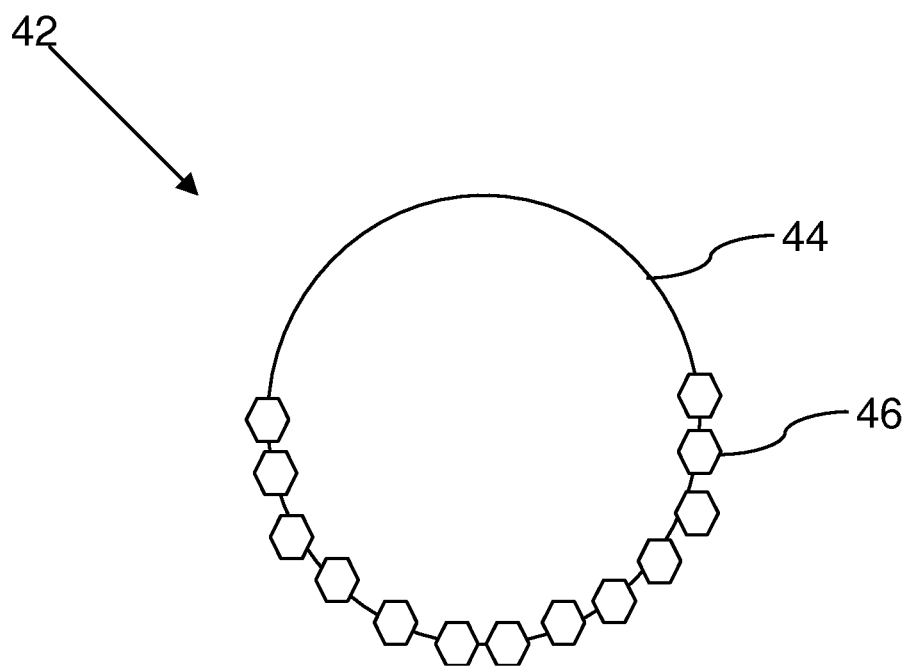

FIG. 11 shows a top view of an embodiment of a lighting array 42, according to embodiments of the present disclosure. Lighting array 42 can include a circular chassis 44 including individual lights 46 mounted on the chassis 44. In embodiments, the individual lights 46 can be LEDs. In embodiments, the more LEDs that can be provided within the lighting array 42 the greater the granularity that can be provided and the more individual locations that can be served by the lights 46 of the lighting array 42. As described herein, each of the lights 46 within the lighting array 42 can be mapped to specific locations within a shop 22 (FIG. 2), and as the user 20 moves towards their target location, different lights 46 within the array 42 can be illuminated to guide the user 20.

Various lighting technologies can also be used. For example, a laser based lighting device could be used that can project light onto a surface, such as the floor where the user 20 is currently standing. A direct beam with persistence of vision (e.g. beaming light at least every $1/25^{th}$ of a second) can be used that can be seen by the user 20 as their location changes.

Figure 12:
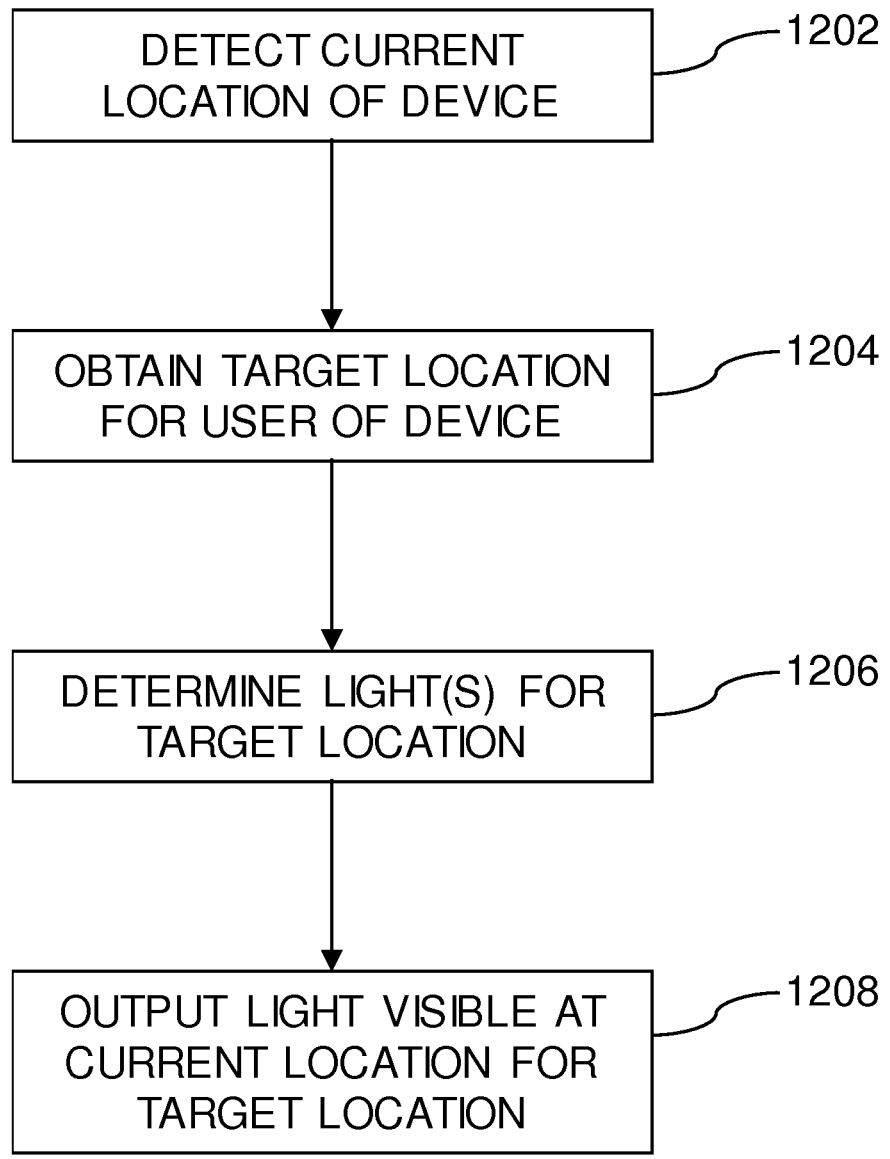
FIG. 12 depicts a flowchart of a method of operating a system of lighting control, according to embodiments of the present disclosure.

Referring to FIG. 12, a method of lighting control for location finding can be seen, according to embodiments of the present disclosure. In embodiments, the method includes, at operation 1202, detecting the current location of a computing device of a user. As described herein, the location of the computing device can be determined using location detectors. The location detectors can use short range communications to identify the computing device and determine a location for the device. The method can include, at operation 1204, obtaining a target location for the user. As described herein, the target location can be obtained from the computing device of the user. For example, in embodiments, the target location could correspond to an item on a shopping list contained in a mobile phone of the user. The method can include, at operation 1206, determining one or more lights of a lighting system that indicate the target location of the user and are visible at the current location of the computing device of the user. As described herein, the lights can include a group of one or more LED arrays. The LED arrays can be configured to communicate with a controller to indicate a path from the user's location to the target location.

The method can include, at operation 1208, outputting light from the determined one or more lights of the lighting system that is visible at the current location of the computing device of the user. As described herein, the LED arrays can indicate the path by determining one or more LEDs of the LED array that is visible at the user's location and can output light from the one or more LEDs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining, using a group of location detectors, a first location of a computing device of a user;
   obtaining, from the computing device, a target location for the user;
   determining a path from the first location to the target location, the path determined at least based on a lighting system including a group of light emitting diode (LED) arrays, each LED array of the group of LED arrays including a plurality of LEDs arranged in a semi-circular formation on a chassis; and
   indicating, using a first LED array of the group of LED arrays, a first portion of the path to the target location, the first portion of the path indicated by:
     determining, for the plurality of LEDs of the first LED array, at least one LED that is visible at the first location; and
     outputting light from the at least one LED of the first LED array that is visible at the first location.

2. The method according to claim 1, further comprising:
   determining, using the group of location detectors, a second location of the computing device, the second location within a proximity of the first LED array; and
   in response to determining that the second location is within the proximity of the first LED array, indicating, using a second LED array of the group of LED arrays, a second portion of the path to the target location, the second portion of the path indicated by:
     determining, for the plurality of LEDs of the second LED array, at least one LED of that is visible at the second location; and
     outputting light from the at least one LED of the second LED array that is visible at the second location.

3. The method according to claim 1, further comprising:
   querying the computing device of the user for user information and determining the target location for the user from the queried user information.

4. The method according to claim 1, further comprising:
determining, using the group of location detectors, a third location of the computing device, the third location within a proximity of the target location;
determining that the computing device has stayed within the proximity of the target location for a predetermined duration; and
obtaining, in response to determining that the computing device has stayed within the proximity of the target location for the predetermined duration, a new target location for the user.

5. The method according to claim 4, further comprising:
determining a second path, the second path from the third location to the new target location, the second path determined at least based on the lighting system including the group of light emitting diode (LED) arrays; and
indicating, using a second LED array of the group of LED arrays, a first portion of the second path, the first portion of the second path indicated by:
  determining, for the plurality of LEDs of the second LED array, at least one LED that is visible at the third location; and
  outputting light from the at least one LED of the second LED array that is visible at the third location.

* * * * *